Nov. 2, 1954  T. W. ZOBEL ET AL  2,693,065
COMBINED WORKING AND MEASURING DEVICE FOR MANUFACTURING
PLATE SURFACES OF UNUSUAL LARGE DIMENSIONS AND VERY
HIGH QUALITY IN ANY DESIRED POSITION OF THE PLATE
Filed Jan. 26, 1951  4 Sheets-Sheet 2
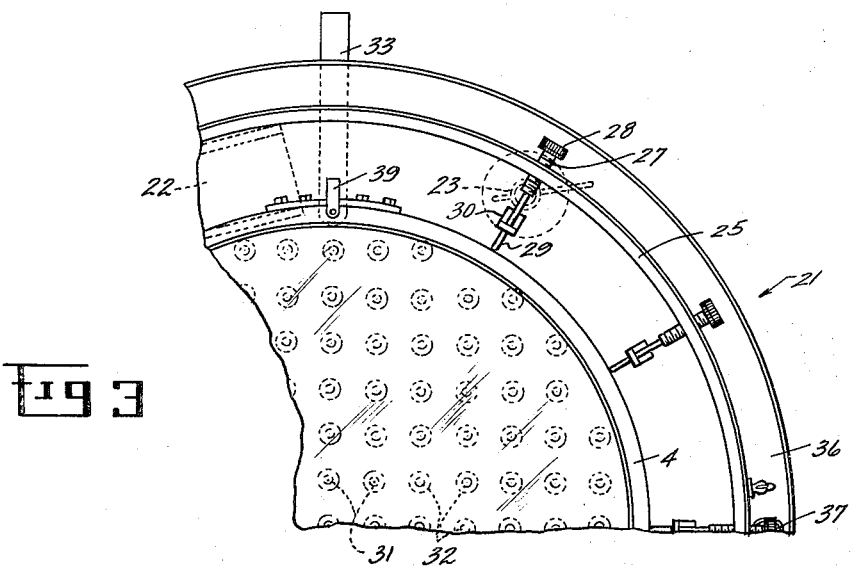
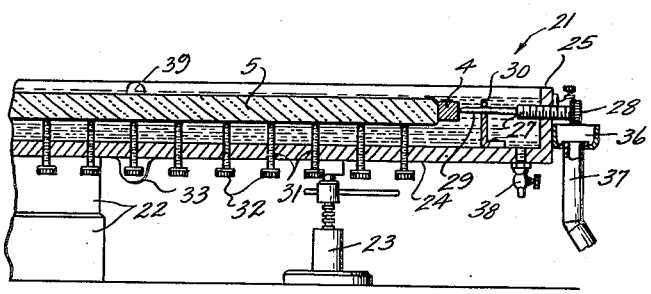
INVENTORS.
THEODOR W. ZOBEL
FERDINAND M. MIRUS
BY
ATTORNEYS

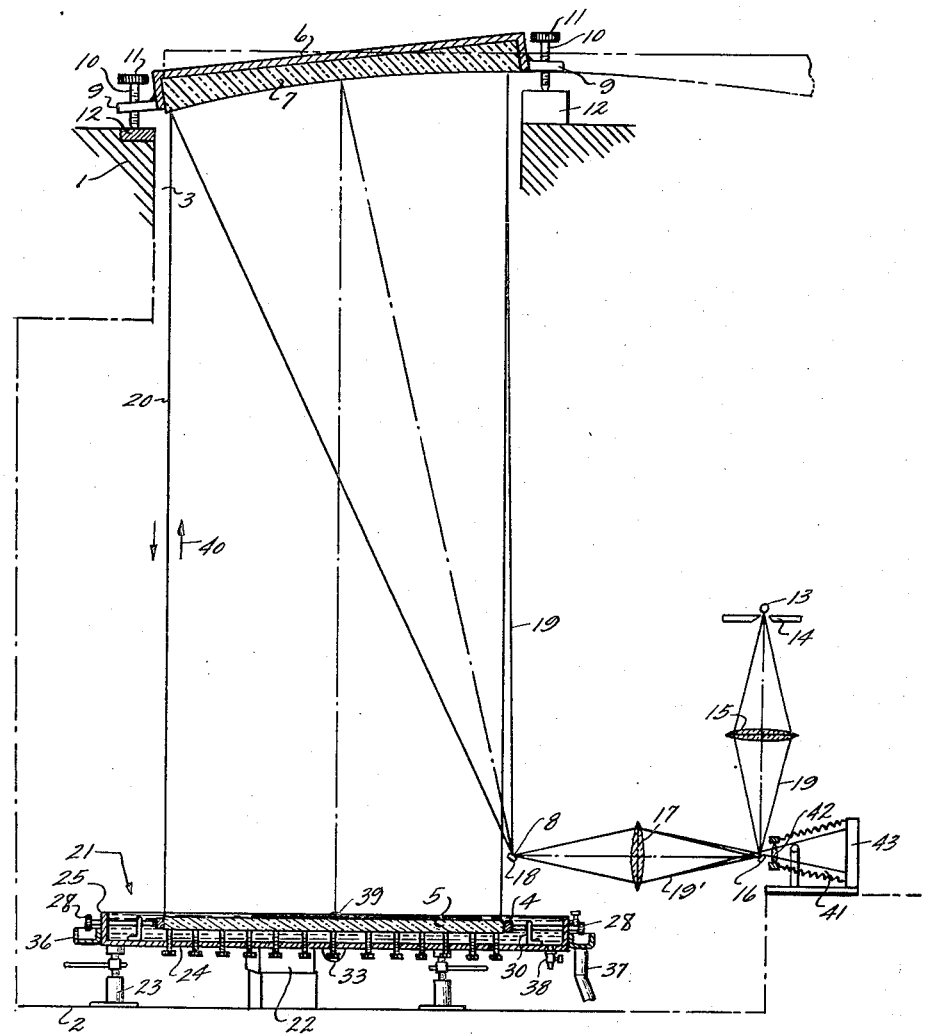

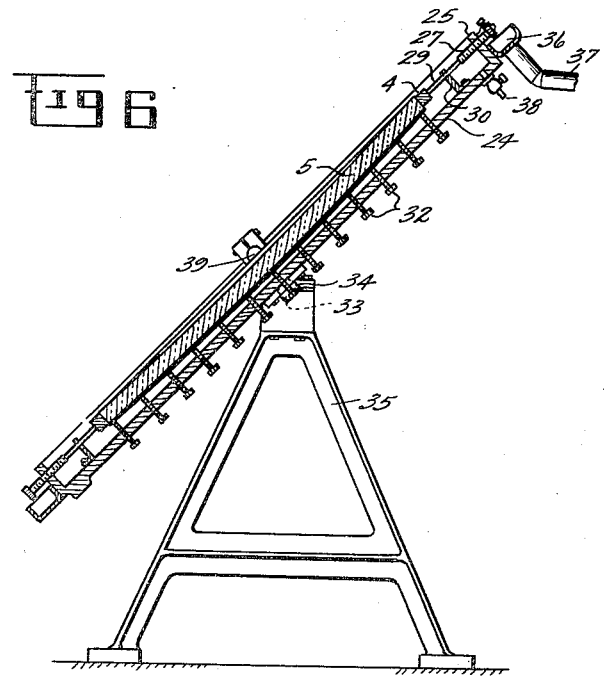
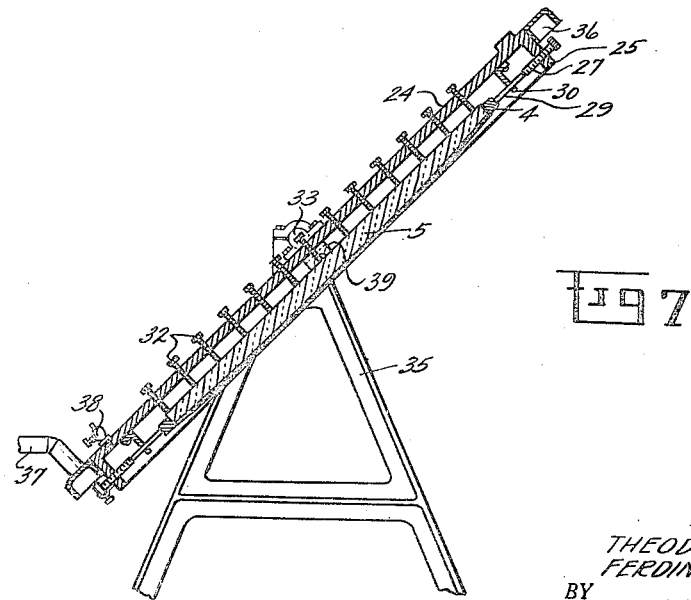

United States Patent Office 2,693,065
Patented Nov. 2, 1954

2,693,065

COMBINED WORKING AND MEASURING DEVICE FOR MANUFACTURING PLATE SURFACES OF UNUSUAL LARGE DIMENSIONS AND VERY HIGH QUALITY IN ANY DESIRED POSITION OF THE PLATE

Theodor W. Zobel, Braunschweig, and Ferdinand M. Mirus, Weiner, Germany; Robert F. Reckman, administrator of said Theodor W. Zobel, deceased, assignor to Gertrude Zobel; The Central Trust Co., executor and trustee of the estate of said Gertrude Zobel, deceased Application January 26, 1951, Serial No. 208,050

10 Claims. (Cl. 51—217)

(Granted under Title 35, U. S. Code (1952), sec. 266)

The invention described herein may be manufactured and used by or for the United States Government for Governmental purposes without payment to us of any royalty thereon.

This invention relates to optics and more particularly to apparatus for the use of optical glass plate manufacturers for producing glass surfaces of highest optical quality and flatness where the surfaces are unusually large, considering the final working conditions and the flexibility of the plates and is a continuation in part of our copending application, Serial No. 205,162, filed January 9, 1952, Patent No. 2,641,958, issued June 16, 1953. The apparatus may also be used for testing the optical quality of the entire surface of a glass plate in one step to obtain an interference picture of the whole surface of a plate having flexibility, and designed to be used in any predetermined operative position, particularly an inclined position.

In making small plane mirrors and beam splitter plates, up to about 12 inches in diameter, for use in interferometers and for other high optical quality purposes, no special problems are encountered in the manufacturing process and measuring methods, but these plates of "interference" quality are very high in price because of the extended and careful workmanship required, when using ordinary conventional grinding and polishing methods, and, of course, because of the required high optical quality of the glass mix.

Deformation of these small plates by their own weight is somewhat negligible so long as the ratio of thickness to diameter or width does not exceed about 1:7. A usual method of testing the flatness of these plates is to bring the plate surface being tested into contact with the surface of a comparison "plate" of the highest optical quality and known accuracy, and by illuminating this arrangement with a monochromatic light an interference pattern can be produced within the air layer between the contacting surfaces of the plates which will show "fringes," the width from fringe to fringe corresponding to a difference in distance from the comparison surface to the tested surface of one-half of a wave length of the light being used. In this way the optical quality of glass surfaces can easily be determined, so long as the flexibility of the glass plate is practically zero or can be neglected, and providing that the comparison plate covers the entire field of the tested surface.

Until recently it was assumed that the optical glass material used was good enough for transmitted light and that the uniformity of the "refraction number" throughout plates of high optical quality was so perfect, or sufficiently perfect that no Schlieren and striae would disturb the optical quality or the interference pattern of the transmitted light, when, for instance, the plates are used as the optical parts of an interferometer.

When glass plates of unusually large dimensions, having high optical quality, are required many new and interesting problems arise. One problem is in the glass production itself. It appears very difficult, and also extremely expensive, if not impossible, to manufacture very large glass interferometer plates having a thickness to diameter ratio of 1:7 out of uniform optical glass material.

At the present time the optical industry is capable of producing optical glass plates of unusually large sizes of from 36 inches to 50 inches, and possibly larger, as mass produced glass, which are about 1 and ¼ inches thick only, or have a thickness to diameter ratio of from 1:29 to 1:40. Since these plates are relatively thin the flexibility thereof can no longer be ignored, nor can a comparison plate of such size and ratio be used in contact with the entire tested surface to determine the flatness of the reflecting surfaces of the plates because both the comparison plate and the test plate are influenced by their flexibility and weight, and by the bending of the test plates due to their weight according to their position in the interferometer.

At the present time, prior to the subject invention, no measuring methods existed for determining the surface character and quality of the above mentioned large and flexible optical plates in an accurate way, or a method or apparatus for the satisfactory manufacture of such large flexible optical plates, especially where they are used for tranmitted light when positioned in an inclined working condition in an interferometer apparatus.

It should be noted that it is impossible, by ordinary methods, to guarantee the accuracy of a glass plate of 36 inches and larger by 1 and ¼ inches thickness to be within a quarter (or a tenth) of a wave length of light distributed uniformly over the whole field when the flexibility of the plate is from 100 to 300 times greater. A glass plate, as indicated above, when located horizontally will produce an interference pattern change of about 70 fringes—or a 35 wave length displacement of its surface.

One of the important objects of this invention is the method and means for accurately determining how much these unusually large flat reflector plates and beam splitter plates are bent under the influence of their own weight when they occupy their predetermined working positions in the apparatus, and to compensate for the bending while preparing the light reflecting or transmitting surfaces, so that the two surfaces of an unusually large light transmitting plate will be optically flat and parallel when placed in its working position; or that the reflecting surface of an unusually large plate mirror will be optically flat when placed in its working position.

Usually a glass plate is not flat on both sides, but is ground and polished while supported on a flat or horizontal solid working base. Assuming that the supporting base is solid, even, and flat, the plate would be supported on such a base; but its own weight, where a large plate in excess of 36″ having a thickness to diameter ratio in excess of 1:29 is being manufactured or surface finished, would flex and conform the plate surface to the working base surface. This happens independently of the initial curvature or contour of the plate surface which may be either concave or convex, and an uneven surface becomes flattened within a certain amount, and an additional waveness can be caused over the average curvature of the plate. In this way the plate becomes ground and polished until a desired high grade of accuracy is believed to be reached by checking the surface only partially by a small accurate comparison plate. After one side is ready and it is believed that the desired accuracy on one side has been obtained the plate is inverted on the solid support and allowed again to sag to its weight level against the support in the opposite direction. No effort has been made prior to the subject invention to support the plate in its natural (unsupported) working relation during the polishing, grinding and testing operations.

Another object of the invention is the provision of a tool or apparatus for supporting large glass plates for the grinding, polishing and testing operations which solves the difficult problem of producing glass plates of unusually large dimensions having relatively small thickness to diameter ratios, or with ratios in excess of 1:29 having very high optical quality and flatness for operation in any predetermined angular working positions, particular in positions other than vertical.

Other objects and advantages of the invention will become apparent from the following description, taken in connection with the accompanying drawings, in which like reference characters refer to like parts in the several figures.

Fig. 1 is a vertical sectional view somewhat diagrammatically illustrating the general arrangement of a combined work supporting and measuring apparatus incorporating our invention therein, and disclosing a symmetrical combined light inlet and outlet arrangement.

Fig. 2 is an enlarged fragmentary vertical cross sectional view through a portion of our improved work supporting frame, or receptacle, showing the same in horizontal position with a large optical reflecting glass plate mounted therein, disposed in the position for testing or for further grinding and polishing.

Fig. 3 is an enlarged fragmentary plan view showing the apparatus illustrated in Fig. 2.

Figure 5:
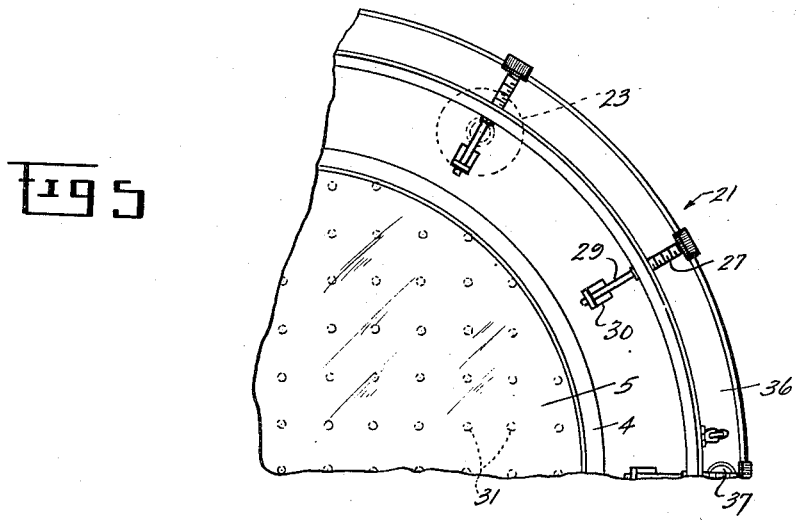
Fig. 5 is a fragmentary plan view of the apparatus shown in Fig. 4.

Fig. 6 is a vertical sectional view of our improved means for completely supporting the plate in its loaded condition, while in its predetermined working position, and Fig. 7 is a view similar to Fig. 6 but with the supporting frame turned 180° to support the plate for the subsequent finishing of the other surface thereof, after the front surface shown in Fig. 6 has been finished to an optically flat condition.

In carrying out our invention we preferably provide a rigid upper supporting structure 1 carried on a rigid base or lower support 2 so that there will be no relative movement or vibration therebetween. The supporting structure 1 is provided with a vertical opening 3 having a size sufficiently large to extend coextensively above our plate supporting receptacle or frame 4, later to be described, for supporting in a horizontal position, the glass plate 5 to be figured and tested. This frame 4 is shown in Figs. 2 to 7.

Mounted directly above the opening 3 is a large mirror supporting frame 6 in which is mounted a large concave mirror 7 having a parabolic reflecting surface, or a portion of a parabolic reflecting surface, having an optical axis extending vertically downward and located at one side of the opening 3, its focal point 8 being located just above the plate supporting frame 4 at one side thereof. The mirror supporting frame 6 is provided with at least three projecting lugs or ears 9 in which are threaded fine thread adjusting screws or jacks 10 having adjusting heads 11. The screws 10 are adjustable in the lugs and their ends rest on suitable hardened supports, such as blocks 12 spaced around the opening 3 and carried by the supporting structure 1 as shown in Fig. 1. Adjustment of the screws 11 causes vertical or tilting adjustment of the parabolic reflector 7 so as to locate its focal point and dispose the optical axis of the reflector 7 in a precise vertical direction.

A concentrated light source is indicated at 13, preferably monochromatic, the light therefrom passes through a light aperture 14 of suitable size and shape, and a positive lens element 15 concentrates the light from the source 13 at substantially a point on a very small optically flat mirror 16 inclined at an angle of 45° across the light beam in a plane passing through the axis of the large parabolic mirror 7 at its focal point 8, a second positive lens element 17 gathering the expanding light rays which are reflected by the inclined mirror 16 and concentrate them on a second very small inclined optically flat mirror 18 having its reflecting surface extended through the focal point of the large parabolic portion of the mirror 7. The mirror 18 reflects the inlet light beam 19 through the focal point of the parabolic reflector 7 and the reflector 7 reflects and collimates the light beam downwardly in a vertical direction parallel to the optical axis of the reflector 7.

When a large optical glass plate, such as the plate 5 is to be tested for optical flatness of its surface, or to determine its amount of "sag" of the plate under its own weight, or to determine its surface contour condition in an unloaded state, this plate is disposed horizontally below the parabolic reflector 7 in the path of the collimated reflected beam 20.

A large work supporting receptacle or pan 21 is provided which is rigidly supported on the lower support 2 on a plurality of adjustable wedge blocks 22 and a plurality of jack screws 23 disposed in substantially equally spaced relation on the support 2 around and below the outer peripheral portion of the receptacle. By manipulation of the jacks 23 and wedge blocks the receptacle and the large glass plate within the receptacle 21 can be leveled so as to be normal to the axis of the collimated beam 20.

As before mentioned the large glass plate 5 is mounted within an annular "handling" ring or band 4. The construction of the receptacle 21 can best be understood by reference to Figs. 2 to 7. It comprises the "work support" in which the work is supported throughout its surface testing and finishing or manufacturing operations. The work supporting receptacle or pan 21 is preferably a rigid circular metallic receptacle having a bottom 24 which is large enough to extend beyond the annular band 4. An annular flange 25 projects upwardly from the periphery of the bottom 24 having equally spaced threaded radial openings 26 provided therein near the top edge of the flange 25 to receive radially disposed threaded jack screws 27 having knobs 28 for screwing the jack screws in or out. The inner end portions of the jack 27 are reduced and smooth to provide a guide stem 29 which are slidably journalled in guide openings formed in the guide brackets 30 which are secured to and project upwardly from the bottom 24 of the work supporting receptacle or pan 21.

The bottom 24 of the work receptacle or pan 21 is provided with a plurality of closely and evenly spaced threaded vertical openings 31 in which are threaded vertically adjustable supporting screws 32 for supporting the glass work piece 5 under conditions later to be explained. Since very fine or micro-adjustments are required, the pitch of the screw threads will be small. The purpose of the screws 32 is to support work piece uniformly through its entire surface area without causing any bending or deformation of the glass plate or work piece 5, therefore the screws are just brought into touching contact with the rear face of the glass plate 5 without applying any moving pressure to the plate.

Extending from diametrically opposite sides of the receptacle 21 are journal bearings or trunnion shafts 33. These are adapted to be journalled in suitable bearing openings 34 formed in supporting frames 35 (later to be described), shown in Figs. 6 and 7.

Referring more particularly to Figs. 2 to 5 the receptacle 24 is surrounded by an annular trough or ring shaped pan 36 having a drain pipe 37. A petcock 38 is provided in the bottom of the receptacle 24 near the wall 25 which provides means for draining the interior of the tray or pan 24, as later explained.

The work piece supporting frame or band 4 is also provided with a pair of radial trunnion members 39 extending diametrically outwardly from the opposite sides thereof to provide a satisfactory "manipulating" and supporting means for handling the glass plate 5 such as positioning the same within the receptacle 21, and for inverting the glass plate 5 when one side thereof has been ground and polished, and found to be optically flat and satisfactory.

Referring again to Fig. 1, it being assumed that the upper (or lower) surface of the glass plate 5 has been ground and polished, and it is desired to test the same for flatness, the collimated beam striking the upper surface will be reflected back again to the concave mirror 7, as indicated at 40, the concave mirror 7 reflecting the beam back to the second small mirror 18 at the focal point 8 of the reflector 7. The expanding beam is reflected through the lens 17, converging the returning beam through a focal point located just slightly off the axis of the initial beam 19' so that the same passes very close to one side of the small flat inclined mirror 16, a very slight difference in the inclination of the mirrors 18 and 16 causing the returning beam to pass through the point very closely adjacent to the mirror 16.

A suitable camera, viewing device, or screen, is indicated generally at 41 having a lens 42 and a viewing screen 43 for obtaining a picture of the interference in the returning beam. If the work piece 5 is supported on the jacks 32, and a suitable reflecting liquid, such as water, for instance, is placed in the receptacle 21 with its upper surface just covering the surface of the plate 5, this surface will be absolutely level and flat and will also reflect the collimated light beam back to the viewing screen. The surface of the reflecting liquid becomes the comparative surface and any variation in the contour of the adjacent reflecting surface of the glass plate 5 to that of the surface of the liquid will become visible on the screen 43 as interference fringes.

Figure 4:
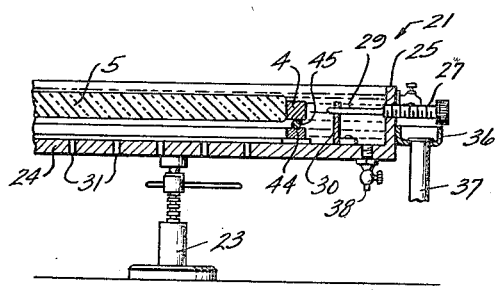
Fig. 4 is a fragmentary vertical section of the apparatus shown in Figs. 1 and 2 respectively, but showing the same with the adjustable supporting screws removed, for initially determining the maximum amount of bending or curvature of upper surface of the reflector plate when disposed in a horizontal position, supported at its periphery only.

When it is desirable to determine how much a glass plate will initially flex between maximum loaded and unloaded condition the vertical screws 32 are withdrawn from their engagement with the lower plate surface. An annular rigid supporting ring 44 is placed on the bottom 24 of the receptacle and a rubber gasket member 45 is placed on the top of the supporting ring. The supporting frame 4 carrying the glass plate 5 to be tested and "figured" is then placed on the gasket and liquid such as water is introduced into the space between the wall 45 of the receptacle 21 and the annular supporting ring 44, until the liquid level extends across the top surface of the plate 5 in a thin layer as seen in Fig. 4. Since the liquid will be level the interference fringes produced by the collimated light reflected respectively by the liquid surface and the light reflector by the surface of the plate 5 and the number of fringes produced will determine the amount of bending of the plate under its own weight while in a horizontal position. If the water is removed and the receptacle or pan is now filled with mercury with radial screws 27 loosened or removed and holes covered the mercury will support the plate 5 in its unloaded condition. If water is now inserted into the receptacle so as to just cover the upper surface of the plate 5 the interference fringe pattern produced on the screen 43 will indicate the upper surface contour of the glass plate 5, as compared to the level surface of the liquid, when the glass plate 5 is in unloaded condition.

In order to determine the curvature of the glass plate 5 in its normal working condition the supporting frames 35 are used. The trunnion members 33 of the annular receptacle or pan 21 are inserted in the guide openings or bearings 34 and the pan 21 together with the glass plate 5 can now rotate on the trunnions until the glass plate 5 occupies the same inclined position that it will occupy when it is in its final working position in the interferometer apparatus in which it will be used.

Referring to Fig. 6 the glass 5 is shown in its working position, and in an exaggerated manner is shown bent under its own weight. The supporting screw members 32 are advanced toward the rear surface of the plate 5 until they just touch the plate without exerting any pressure on the plate surface. After the screws have all been adjusted to this touching position the receptacle 21 with the plate 5 therein is removed from the frame and again deposited on the wedge blocks 22 and jacks 23 and leveled. The upper surface of the glass plate 5 being finished is now firmly supported at its rear face and has the same front surface curvature or bending that as when it is in place in its final inclined working position. The upper surface can now be ground, polished and tested as shown in Fig. 1 until the interference fringes produced on the recording screen 43 indicate the desired optical flatness of its upper surface.

The plate holding frame 4, carrying the glass plate 5 is now removed from the receptacle 21, and is inverted and replaced, as seen in Fig. 7, with the newly ground "flat" side facing downwardly toward the screws 32. The receptacle is again tiltably mounted on its trunnions 33 in the frame 35, and is tilted to bring the glass plate 5 again to the same inclined working position as mentioned before, that of its final working position as shown in Fig. 6.

The receptacle 21 under these conditions will be inverted and the glass plate with its optically "flat" side facing the bottom 24. The jack screws 32 are again moved into touching contact with the "flat" surface of the plate so as to firmly support the plate without moving it. The receptacle 21 is now removed from the frame 35 and again placed on the wedge blocks 22 and jacks 23 and leveled as shown in Figs. 1 to 5 and the upper surface of the glass plate 5 is ground, polished, and tested, as before set forth in connection with the description of the apparatus shown in Fig. 1, until the flatness of the "upper" surface is accomplished by the definite minimum number of interference fringes showing on the camera screen 43.

It should be mentioned, that during the grinding, polishing and testing operation just described, in connection with both of the surfaces, the jack screws 32 support the plate in its horizontal position so that it cannot sag or bend further under the influence of its own weight or grinding and polishing pressure which is applied to the surface being finished.

When the second surface of the plate 5 is finished and the plate is placed in its working position in the interferometer apparatus (not shown), while its weight is effective the surface will be precisely optically flat. If the finished plate is used as a full mirror element in an interferometer apparatus only one reflecting surface is important and it is therefore not necessary to finish both sides of the plate. If the plate 5 is being used as a partially transparent mirror or beam splitter plate element in an interferometer, it is important that both the front and the rear surfaces of the plate shall be optically flat and parallel to each other, if the highest grade accurate interference phenomenon is to be obtained.

After both surfaces of the plate have been ground and polished as before set forth, the plate 5 can again be placed under the reflector 7 with the jack screws 32 supporting the plate and a reflecting liquid such as water, for instance, placed in the pan 21. If the liquid covers the upper surface of the plate, the interference phenomenon produced by light rays reflected from the surface of the liquid and the adjacent upper surface of the plate can be observed. If the liquid level is lowered in the receptacle so that it is just below the lower surface of the plate, the interference phenomenon between the lower surface of the plate 5 and the liquid surface can be observed on the screen 43.

We claim:

1. A combined work holding apparatus for manufacturing and testing optical surfaces of a flat plate for optical apparatus, having unusually large surface dimensions and high optical quality, for use in any predetermined working position; comprising a work holding tray; supporting means carried by the tray for supporting the plate rigidly around its periphery within the tray below the top of the tray with the surface to be tested and finished facing outwardly; rigid supporting means for supporting the tray for tilting adjustments about a horizontal axis whereby the tray is rotatably adjustable about said axis to position the plate therein in any predetermined working position, and adjustable plate surface supporting means carried by the tray for adjustment toward the plate surface opposite the outwardly facing surface in predetermined areas within the periphery of the plate for touching engagement with said areas, whereby the back surface of the plate is supported against bending under its own weight when the tray is rotated from said predetermined working position to a horizontal position for testing and surface finishing.

2. Apparatus as claimed in claim 1, in which the means for supporting the plate at its periphery comprises an annular supporting band secured around the periphery of the plate and includes radially adjustable supporting means adjustably carried by the tray and movable into supporting engagement with the band.

3. Apparatus as claimed in claim 2 in which the tray comprises a liquid receptacle having an annular liquid retaining wall surrounding the plate and the band in outwardly spaced relation thereto, and the plate surface supporting means comprises a plurality of adjustable supports adjustable vertically from the bottom of the pan toward the adjacent surface of the plate, to be finished and tested.

4. Apparatus as claimed in claim 3 in which the plate surface supporting means comprises a plurality of threaded jack screws extending normal to the plate surface and rotatably threaded in threaded openings therefor extending through the bottom of the work holding tray.

5. In a glass plate work holding apparatus for large size optical flat plates; a recessed work support; means carried by the work support for supporting a glass plate therein at its periphery with an exposed surface to be finished; means for supporting the work support rigidly in any predetermined tilted and horizontal positions to position the plate carried therein in a position identical to its predetermined working position, a plurality of spaced surface supporting means adjustably carried by the bottom of the recessed work support for touching engagement with the unexposed surface of the glass plate in predetermined areas in rear of the exposed surface to be finished, permitting rigidly supporting the work support to position the glass plate therein in a horizontal position with the plate supported by surface supporting means, whereby the exposed surface is supported by the surface supporting means in a horizontal position for subsequent surface finishing and light interference testing operations, means carried by said work support for retaining a quantity of a reflecting liquid within the work support to dispose its inherently level flat surface next to the exposed surface of the plate to form a comparison reflecting surface, whereby a collimated light beam striking the comparative surface of the liquid perpendicular thereto, and striking the exposed surface of the plate will be reflected therefrom to form an interference beam for indicating the optical quality of the plate surface.

6. Apparatus as claimed in claim 5 in which the work support comprises an open liquid retaining receptacle having a surrounding side wall, and the means carried by the work support for supporting the glass plate comprises an annular band adapted to be secured around the glass plate at its periphery, said supporting means including radially adjustable supporting means carried by the surrounding side wall, adjustable into supporting engagement with the periphery of the annular band.

7. Apparatus as claimed in claim 6 in which the bottom of the liquid receptacle is formed with a plurality of horizontally spaced threaded vertical opening therein, and the plural surface supporting means comprises jack screws threaded in the threaded openings with their inner ends extending toward the adjacent surface of the glass plate and are adjustable by rotative adjustment of the jack screws into touching engagement with said adjacent surface of the plate, whereby to support the opposite or exposed surface of the glass plate within the confines of the annular band during finishing operations and during testing operations.

8. Apparatus as claimed in claim 7, in which the work support comprises a pan-shaped receptacle having diametrically opposite radially projecting bearing members adapted to support the receptacle for rotative adjustment about a horizontal axis whereby the receptacle is adjustable to position the glass plate supported therein by its periphery in its intended working position prior to the adjustment of the jack screws into touching engagement with the adjacent surface of the plate for supporting the glass from further bending under its own weight when the work support is rotated to dispose the exposed surface of the glass plate facing upwardly and in a horizontal position, for subsequent finishing.

9. A work holder for interferometer plate finishing and testing apparatus for large size optical flat plates; a rigid work holding receptacle adapted to receive the glass plate therein and to receive a transparent liquid having a reflecting surface, in sufficient quantity to cover the plate; said receptacle having a flat bottom, and an annular side wall connecting the bottom to form the receptacle and extending upwardly to surround the plate in radially spaced relation; a plurality of adjustable jack screws carried by the receptacle, and projecting radially inward toward the periphery of the plate; an annular plate supporting band adapted to be secured about the periphery of the plate to be finished and tested, disposed to be supported within the receptacle by said jack screws incident to radial engaging adjustment of the jack screws with the band, whereby the plate is supported within the receptacle substantially parallel to and spaced horizontally from the bottom of the receptacle; said bottom having a plurality of threaded openings formed therein in predetermined spaced relation to each other, having parallel axes extending perpendicular to the bottom, adapted to extend toward similar predetermined areas of the surface of the plate, perpendicular to the plate surface; screw jack members threadably received in said threaded openings for rotative touching engagement with the adjacent plate surface; means for rigidly supporting said receptacle to dispose the surface of the supported plate therein in a horizontal position with the jack screw members rigidly supporting the plate against undetermined bending under its own weight during the finishing and testing operations relative to the plate surface.

10. A work holder for carrying out finishing and testing operations on the surfaces of a flat glass plate of unusually large dimension for use in interferometer apparatus; comprising a substantially circular receptacle having a bottom and an annular connected upstanding side wall adapted to surround the glass plate to be finished and tested, said wall surrounding the periphery of the plate in radially spaced fixed relation to the periphery of the plate; supporting means for the plate carried by the side wall, adjustable into supporting engagement with the periphery of the plate, comprising an annular plate handling band secured around the periphery of the plate, screw jack members radially adjustable on the side wall into supporting engagement with the band to suspend the plate substantially horizontally above the bottom of the receptacle and below the top of the side wall, support frame means for supporting the receptacle for tilting displacement about a horizontal axis to position the receptacle, to dispose the glass plate fixed therein in a predetermined inclined position substantially identical to its final working position in an interferometer apparatus, to permit the plate to bend or sag under its own weight in said last position; a plurality of adjustable jack screw members carried by the bottom of the receptacle in threaded openings formed through the bottom of the receptacle substantially normal to the lower surface of the plate to rigidly support the same in a plurality of predetermined areas in the bottom below the plate, adjustable into touching engagement with the adjacent plate surface in similar distributed areas of the lower plate surface while the plate is in said inclined position; whereby to support the back of the plate uniformly within the confines of the band against further bending under its own weight when the receptacle is turned to a horizontal position; so that the plate is supported at its back in said horizontal position by said jack screw members to prevent the plate from bending during the finishing and testing of the upper surface thereof in a horizontal position.

References Cited in the file of this patent

UNITED STATES PATENTS

| Number | Name | Date |
|---|---|---|
| 674,951 | Abbe | May 28, 1901 |
| 685,204 | Ewen | Oct. 22, 1901 |
| 1,044,502 | Crehore et al. | Nov. 19, 1912 |
| 1,347,133 | Twyman | July 20, 1920 |
| 1,386,663 | Twyman | Aug. 9, 1921 |
| 1,398,050 | Taylor | Nov. 22, 1921 |
| 1,824,668 | Hasselkus et al. | Sept. 22, 1931 |
| 1,911,153 | Hill | May 23, 1933 |
| 2,128,023 | Specht et al. | Aug. 23, 1938 |
| 2,160,033 | Rosin | May 30, 1939 |
| 2,215,211 | Devol | Sept. 17, 1940 |
| 2,247,047 | Bishop | June 24, 1941 |
| 2,253,054 | Tuttle et al. | Aug. 19, 1941 |
| 2,337,877 | Drescher | Dec. 28, 1943 |
| 2,354,970 | Volkel | Aug. 1, 1944 |
| 2,362,235 | Barnes | Nov. 7, 1944 |
| 2,452,364 | Fowler et al. | Oct. 26, 1948 |
| 2,491,219 | Seidner | Dec. 13, 1949 |
| 2,549,830 | Logan et al. | Apr. 24, 1951 |
| 2,555,387 | Zobel | June 5, 1951 |

OTHER REFERENCES

Rayleigh, Proc. Royal Institute, "Interference Bands and Their Applications," vol. 14, March 24, 1893, pages 72–78.